Aug. 27, 1935.  C. H. H. RODANET  2,012,638
CASE FOR PAINT STICKS, SHAVING SOAP AND OTHER SIMILAR PRODUCTS
Filed Dec. 29, 1932
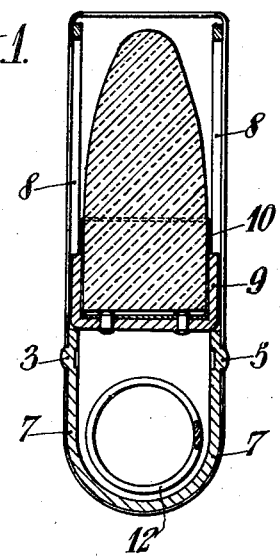
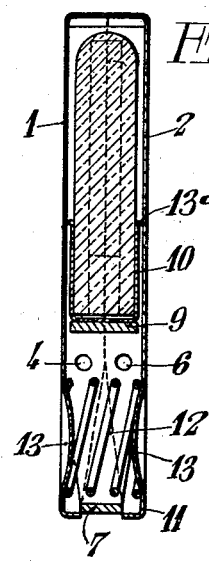
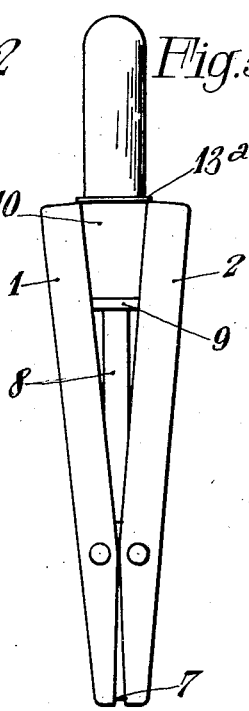
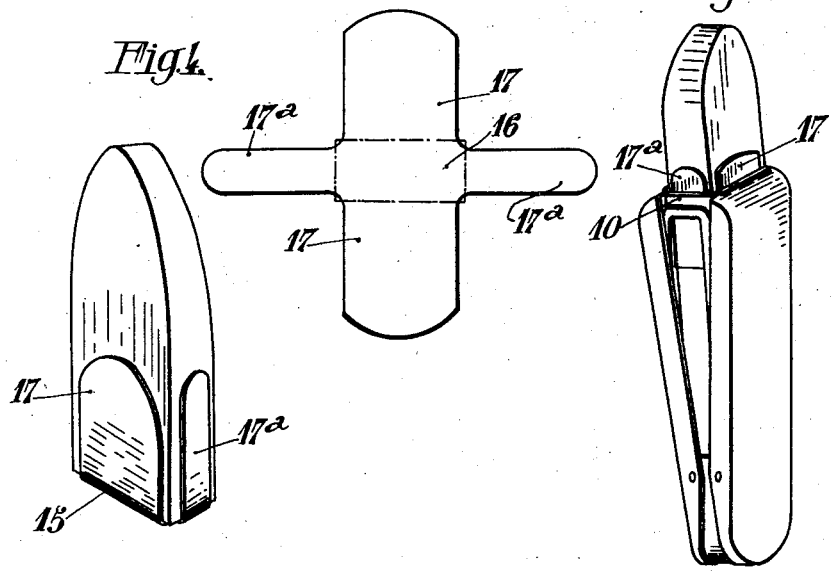
C. H. H. Rodanet
INVENTOR
By Marks & Clerk
Attys.

Patented Aug. 27, 1935

2,012,638

UNITED STATES PATENT OFFICE 2,012,638

CASE FOR PAINT STICKS, SHAVING SOAP, AND OTHER SIMILAR PRODUCTS

Charles Hilaire Henri Rodanet, Neuilly-sur-Seine, France, assignor to Societe Anonyme des Etablissements Rigaud, Paris, France Application December 29, 1932, Serial No. 649,381
In France April 8, 1932

4 Claims. (Cl. 206—56)

This invention has for its object a new case for paint sticks, shaving soap and other products of the same kind, this case serving normally to enclose and protect this product and, upon use, to hold the stick without direct contact of the fingers with the latter.

Cases of this type, known up to now, necessitate the use of both hands, either for opening the case, or for causing the stick to emerge after opening of the said case. Besides, they are often provided with a removable cover which, consequently, may be lost. Finally, the stick usually slides in a guide member which exactly conforms to its shape; now, as, upon use, the end of the stick becomes slightly crushed, when this stick is caused to re-enter its case, the crushed parts are cut away and soil the exterior of the case. This latter inconvenience is to be particularly taken into consideration.

The invention is characterized by the fact that the case is composed of two shells pivoted on a spindle at right angles to the axis of the stick and restored to closed position by a spring, these shells being moreover provided with gripping lugs which also act as a lever for allowing to open the case by a simple pressure of the fingers.

Preferably, when the case thus constituted is open, the stick can be subjected to a limited axial translation obtained by turning the open case downwardly; if, at this moment, the pressure of the fingers is released, the shells act as a clip for retaining the stick by a clamping action. It is advantageous that the stick should be mounted in a socket in order that the shells should press on this socket, and not on the soft material of the stick.

The present invention is moreover characterized by the fact that the stick is permanently provided, at one of its ends, with a yoke, tube or the like conforming to the shape of the stick and fitting in the movable socket of the case.

Such an arrangement allows to easily replace the stick once it is used up. In fact, spare sticks being sold with the yoke or securing tube, it suffices to fit the latter in the socket after having previously removed the used stick.

In this way, the product does not soil the case which remains constantly clean, and the placing of the stick in position as well as its removal are effected without the user's fingers being soiled, the fingers grasping the stick through the medium of the securing yoke or tube.

The invention also relates to a number of particular points which will appear from the following description given, by way of example only, with reference to the accompanying drawing, in which:

Fig. 1 is a sectional elevation of a case according to the present invention, the case being shown in closed position.

Fig. 2 is a corresponding side view thereof, seen in axial section.

Fig. 3 is a side view of the case, the stick emerging.

Fig. 4 is a perspective view of a paint stick provided with a securing yoke.

Fig. 5 is a developed view of the securing yoke.

Fig. 6 is a perspective view of a case according to the invention, the paint stick emerging for use and being provided with a securing yoke.

The case is constituted by two symmetrical shells 1 and 2 pivoted at 3, 4 and 5, 6, respectively, on studs arranged on each of the two branches 7 of a U-shaped member arranged within the case, these studs being obtained by directly cutting them out in these branches. Each of the branches 7 is provided with an opening 8 arranged parallel to the axis of the case and serving as a guide for a slide member 9. On this slide member 9 is secured a socket 10 closed at one of its ends and in which the rouge or like sticks fits. The upper edge of this socket 10 is slightly bent down at 13$^a$. Each of the shells 1 and 2 is provided, at its lower part, with a lug 11. Between both lugs 11 is arranged a spring 12 acting in such a manner as to determine the closing of the case. On each of the lugs 11 is formed a recess or cavity 13 facilitating the gripping action by pressure of the fingers. The inner bulged portion corresponding to each of these cavities also serves as a guide for the spring 12.

The operation is as follows:

The case being opened by simple pressure of the fingers on the lugs 11, it is turned over so as to cause the stick to emerge, the movement of this stick being guided by the slide member 9 moving in the openings 8. By releasing the pressure on the lugs, the spring 12 tends to reclose the case, and the upper part of the shells 1 and 2 presses upon the socket 10 in which the rouge or like stick is placed. The ledge 13$^a$ of this socket bears upon the end of the shells 1 and 2 and prevents the said socket from sliding.

For causing the stick to re-enter the case, it suffices to slightly press on the lugs 11 of the case by holding the latter vertically, with the stick upwards; the edges 13$^a$ of the socket 10 are thus disengaged and the said socket, being released, falls by its own weight within the case.

In the constructional modification illustrated in Figs. 4, 5 and 6, the paint or like stick is provided, at its lower part, with a yoke 15. This yoke 15 is constituted, as more particularly shown in Fig. 5, by four tongues 17 and 17ª, symmetrical two by two, and connected together in such a manner that the base of the stick is slightly larger than the connecting part 16. The stick being placed in the axis of this part 16, the tongues 17 and 17ª are bent down on the side faces of the stick, according to the dotted lines shown in Fig. 5. The width of these tongues is slightly smaller than the width of the corresponding faces of the stick, as shown in Fig. 4. The paint or like stick thus prepared is inserted in the movable socket 10 of the case, the dimensions of which correspond to that of the yoke 15. The height of this socket 10 is such that, the stick being placed in position, the tongues 17 and 17ª extend beyond the upper part of the socket 10 so as to allow the stick to be removed and placed in position without crushing it and without soiling the fingers.

The invention also relates to the use of a socket instead of a yoke, this socket fitting in the movable socket rigid with the case.

Such an arrangement allows the easy replacement of a used stick, the spare sticks being sold with the securing yoke or socket.

What I claim as my invention and desire to secure by Letters Patent is:

1. In a case for paint sticks, shaving soap and similar products, a support for the stick, two shells pivoted on the said support, a spring for restoring the said shells in the closed position, lugs arranged on the said shells for gripping the latter and opening them by pressure of the fingers, means provided on the said support for constituting guide slides for a limited translation of the stick when the said shells are moved away from each other.

2. In a case for paint sticks, shaving soap and similar products, a support for the stick, two shells pivoted on the said support, a spring for restoring the said shells in the closed position, lugs arranged on the said shells for gripping the latter and opening them by pressure of the fingers, means provided on the said support for constituting guide slides for a limited translation of the stick when the said shells are moved away from each other, a metal slide member in which the said stick is placed and arranged to be movable in the said slides, this slide member being clamped and retained by the said shells when the stick emerges from the case and when the pressure is released on the lugs.

3. In a case for paint sticks, shaving soap and similar products, a support for the stick, two shells pivoted on the said support, a spring for restoring the said shells in the closed position, lugs arranged on the said shells for gripping the latter and opening them by pressure of the fingers, means provided on the said support for constituting guide slides for a limited translation of the stick when the said shells are moved away from each other, a metal slide member in which the said stick is placed and arranged to be movable in the said slides, this slide member being clamped and retained by the said shells when the stick emerges from the case and when the pressure is released on the lugs, a yoke or socket placed on the said stick and fitting in the said slide member.

4. In a lipstick holder; and in combination, a housing comprising a stationary portion and a movable portion, the movable portion comprising two opposed side members pivoted intermediate their ends to said stationary portion, hood-like ends on said movable side members forming an end closure for the housing, said side members being capacitated to be opened outwardly by finger pressure to open the housing, a lipstick carrier freely slidable in said housing when the movable side members are in outward position, said stationary portion having means for guiding said carrier, and spring means tending to force said side members toward each other.

CHARLES HILAIRE HENRI RODANET.